(12) United States Patent
Shibata et al.

(10) Patent No.: US 11,813,736 B2
(45) Date of Patent: Nov. 14, 2023

(54) WORKPIECE SUPPLY-AND-DISCHARGE DEVICE

(71) Applicant: HONDA MOTOR CO., LTD., Tokyo (JP)

(72) Inventors: Takeshi Shibata, Tochigi-ken (JP); Takahiro Koga, Tokyo (JP); Shota Hashimoto, Tochigi-ken (JP)

(73) Assignee: HONDA MOTOR CO., LTD., Tokyo (JP)

(\*) Notice: Subject to any disclaimer, the term of this patent is extended or adjusted under 35 U.S.C. 154(b) by 243 days.

(21) Appl. No.: 17/207,789

(22) Filed: Mar. 22, 2021

(65) Prior Publication Data
US 2021/0299888 A1  Sep. 30, 2021

(30) Foreign Application Priority Data
Mar. 25, 2020 (JP) .................................. 2020-053546

(51) Int. Cl.
*B25J 15/02* (2006.01)
*B25J 15/08* (2006.01)
*B23Q 7/04* (2006.01)

(52) U.S. Cl.
CPC ........... *B25J 15/026* (2013.01); *B25J 15/086* (2013.01); *B23Q 7/043* (2013.01)

(58) Field of Classification Search
CPC ...... B25J 9/102; B25J 9/1682; B25J 15/0052; B25J 15/0057; B25J 15/086; B25J 15/026;
(Continued)

(56) References Cited

U.S. PATENT DOCUMENTS 2,919,010 A * 12/1959 Hautau ................. B23Q 7/048
82/125
3,874,525 A * 4/1975 Hassan ............ H01L 21/67742
118/733
(Continued)

FOREIGN PATENT DOCUMENTS

CN       102861955       1/2013
JP       2002-137136     5/2002
(Continued)

OTHER PUBLICATIONS

Chinese Office Action for Chinese Patent Application No. 202110319363.1 dated Jul. 4, 2022.
(Continued)

*Primary Examiner* — Dean J Kramer
(74) *Attorney, Agent, or Firm* — AMIN, TUROCY & WATSON, LLP

(57) ABSTRACT

A workpiece supply-and-discharge device includes a fixed portion, and a swivel portion that swivels on a bed. The fixed portion is provided with a plurality of fixed rails having an arc shape and separated from each other. Movable rails enter or exit from gaps left between the fixed rails as reciprocating actuators operate. Workpiece gripping portions configured to grip a workpiece are provided with sliders. When the workpiece gripping portions carry the workpieces while swiveling integrally with the swivel portion, the sliders transfer from the movable rails to the fixed rails or from the fixed rails to the movable rails.

8 Claims, 12 Drawing Sheets

(58) Field of Classification Search
CPC .... B65G 47/902; B65G 47/907; B23Q 7/043;
B23Q 7/048; B23G 11/00
USPC .......................................... 414/744.3, 744.8
See application file for complete search history.

(56) References Cited

U.S. PATENT DOCUMENTS

| | | | | |
|---|---|---|---|---|
| 3,907,124 | A * | 9/1975 | Legg ...................... | B65G 47/74 414/743 |
| 2017/0368694 | A1* | 12/2017 | Saito ...................... | B25J 15/086 |

FOREIGN PATENT DOCUMENTS

| | | |
|---|---|---|
| JP | 2002-337080 | 11/2002 |
| JP | 2007-238121 | 9/2007 |
| JP | 5712961 | 5/2015 |

OTHER PUBLICATIONS

Japanese Office Action for Japanese Patent Application No. 2020-053546 dated Aug. 29, 2023.

\* cited by examiner

WORKPIECE SUPPLY-AND-DISCHARGE DEVICE

CROSS-REFERENCE TO RELATED APPLICATION

This application is based upon and claims the benefit of priority from Japanese Patent Application No. 2020-053546 filed on Mar. 25, 2020, the contents of which are incorporated herein by reference.

BACKGROUND OF THE INVENTION

Field of the Invention

The present invention relates to workpiece supply-and-discharge devices capable of supplying unmachined workpieces to predetermined machining apparatuses while discharging machined workpieces from the machining apparatuses.

Description of the Related Art

Gear machining apparatuses for producing gears from workpieces are provided with workpiece supply-and-discharge devices attached thereto. For example, a workpiece supply-and-discharge device disclosed in Japanese Patent No. 5712961 (referred to as "workpiece carrying device" in Japanese Patent No. 5712961) includes two or more gripping portions attached to a swivel loader. One of the gripping portions grips a first workpiece to be supplied to a machining table of the gear machining apparatus, while the other gripping portion releases a second workpiece to supply the second workpiece to the machining table. After the second workpiece is subjected to a predetermined machine work, the other gripping portion grips the second workpiece again. Subsequently, the other gripping portion is displaced so that the second workpiece exits from the machining table, and then the swivel loader swivels.

As the swivel loader swivels, the first workpiece faces the machining table, while the machined second workpiece faces a discharge position. The same operations as above are repeated from this point forward to continuously perform the machine work for producing gears from workpieces.

SUMMARY OF THE INVENTION

The swivel loader provided with the plurality of gripping portions is considerably heavy. Moreover, each gripping portion includes a claw operating mechanism for opening and closing a pair of claws by separating the claws from each other and bringing the claws close to each other. In addition, when the swivel loader swivels, the gripping portions grip the workpieces. Consequently, the total weight of the swivel loader and objects that swivel integrally with the swivel loader is significantly heavy. As a result, the swivel loader requires a swivel actuator capable of swiveling the swivel loader even when large loads are applied on the actuator.

However, such an actuator is generally large and heavy. Moreover, a large and heavy swivel actuator cannot achieve a sufficient swiveling speed easily. That is, in the known technology, it is difficult to achieve a reduction in the size and weight of the workpiece supply-and-discharge device and to achieve an increase in the swiveling speed to reduce the cycle time from when an unmachined workpiece is gripped to when a machined workpiece is discharged. Furthermore, in this case, the gripping portions ascend or descend after the swivel loader swivels, and then the gripping claws are opened or closed. Such sequential operations also prevent a reduction in the cycle time.

A principal object of the present invention is to provide a workpiece supply-and-discharge device that can be reduced in size and weight.

Another object of the present invention is to provide a workpiece supply-and-discharge device of which cycle time can be reduced.

According to an aspect of the present invention, a workpiece supply-and-discharge device configured to supply an unmachined workpiece to a machining apparatus and to discharge a machined workpiece from the machining apparatus includes a bed, a fixed portion provided for the bed, a swivel portion configured to swivel on the bed when energized by a swivel actuator, a plurality of fixed rails each having an arc shape and provided for the fixed portion, the fixed rails being separated from each other, a reciprocating actuator configured to move a movable rail having an arc shape into and out of a gap left between the fixed rails, a guiding member provided for the swivel portion, and a workpiece gripping portion including two gripping members configured to grip the workpiece. The workpiece gripping portion includes a slider configured to slide along the fixed rails or the movable rail, and an engagement portion engaging with the guiding member to be displaceable. When the slider is stopped on the movable rail, the movable rail is displaced toward or away from the gap integrally with the workpiece gripping portion, and the workpiece gripping portion grips the workpiece using the gripping members or releases the workpiece. When the movable rail is disposed in the gap, the swivel portion and the workpiece gripping portion swivel in an integrated manner to carry the workpiece. When the workpiece gripping portion is displaced integrally with the movable rail as the movable rail enters or exits from the gap between the fixed rails, the guiding member guides the engagement portion. When the workpiece gripping portion swivels integrally with the swivel portion, the slider transfers from the movable rail to the fixed rails or from the fixed rails to the movable rail.

According to the present invention, only the swivel portion and the workpiece gripping portion swivel. This reduces the total weight of members and mechanisms to be swiveled and thus reduces loads on the swivel actuator. As a result, a small and lightweight actuator can be selected as the swivel actuator, increasing the swiveling speed to reduce the cycle time from when supply (or gripping) of a workpiece starts to when a machined workpiece is discharged.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a workpiece supply-and-discharge device according to the present invention will be described in detail below with reference to the accompanying drawings.

Figure 1:
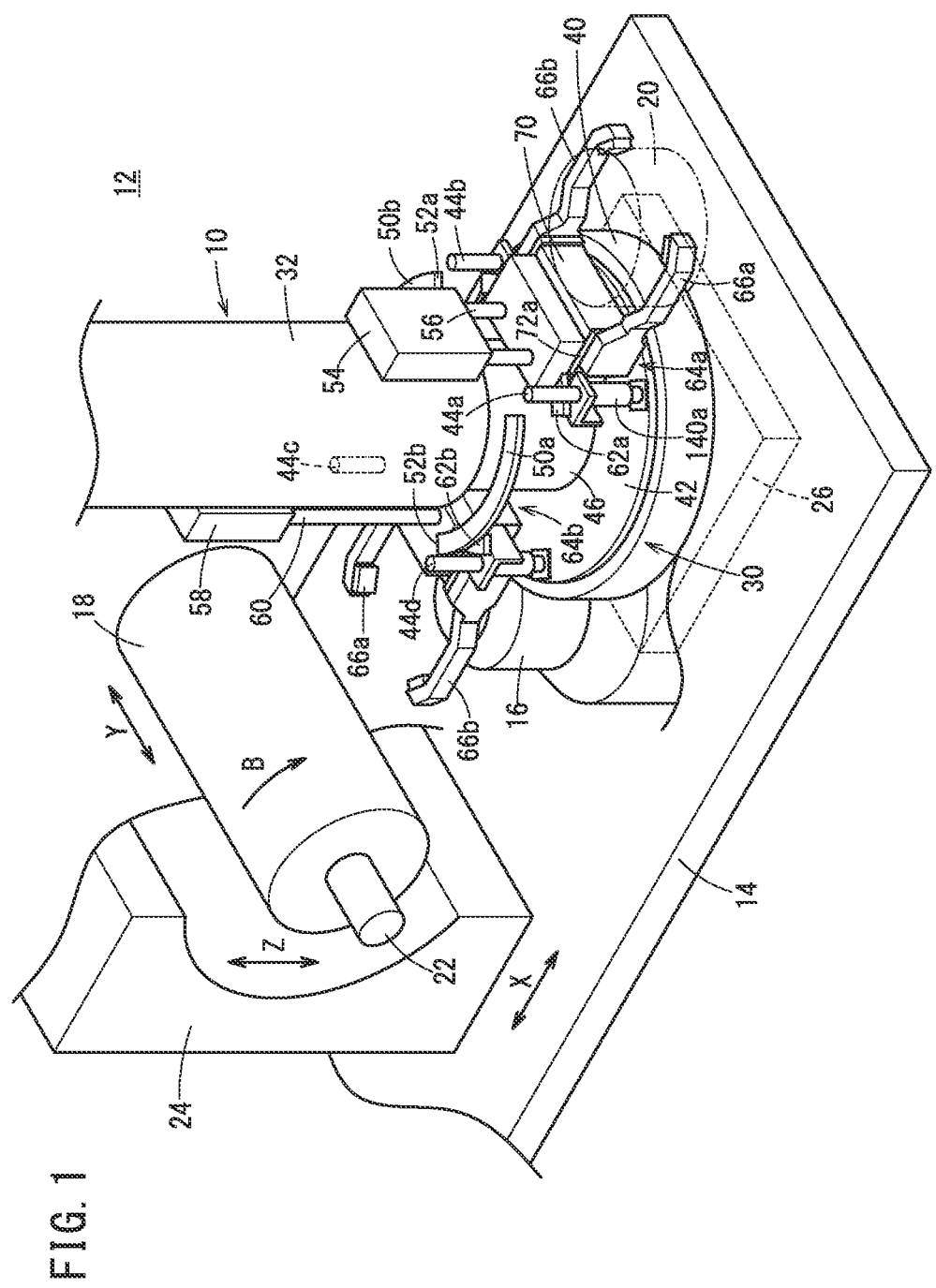
FIG. 1 is a schematic perspective view of a principal part of a gear machining apparatus to which a workpiece supply-and-discharge device according to an embodiment of the present invention is attached.

FIG. 1 is a schematic perspective view of a principal part of a gear machining apparatus 12 to which a workpiece supply-and-discharge device 10 according to this embodiment is attached. First, principal components of the gear machining apparatus 12 will be described. The gear machining apparatus 12 includes a bed 14, a rotary table 16, and a grindstone 18. The rotary table 16 is rotatable relative to the bed 14 and supports a cylindrical helical gear 20 as a workpiece.

The grindstone 18 is a grinding tool for grinding inclined (helical) teeth of the helical gear 20 supported by the rotary table 16. The grindstone 18 is supported by a spindle 22 to be rotatable in a direction of an arrow B. The grindstone 18 can shift in a direction of an arrow Y. The grindstone 18 can also advance and retreat in a direction of an arrow X and ascend and descend in a direction of an arrow Z integrally with an elevator 24. As the gear machining apparatus 12 of this type is well known, detailed descriptions and illustrations of other components are omitted.

Next, the workpiece supply-and-discharge device 10 according to this embodiment will be described. The workpiece supply-and-discharge device 10 shares the bed 14 with the gear machining apparatus 12. A hollow base 26 protrudes from the upper surface of the bed 14 in the vicinity of the rotary table 16. That is, the hollow base 26 is a part of the bed 14. The workpiece supply-and-discharge device 10 is provided for the hollow base 26.

Figure 2:
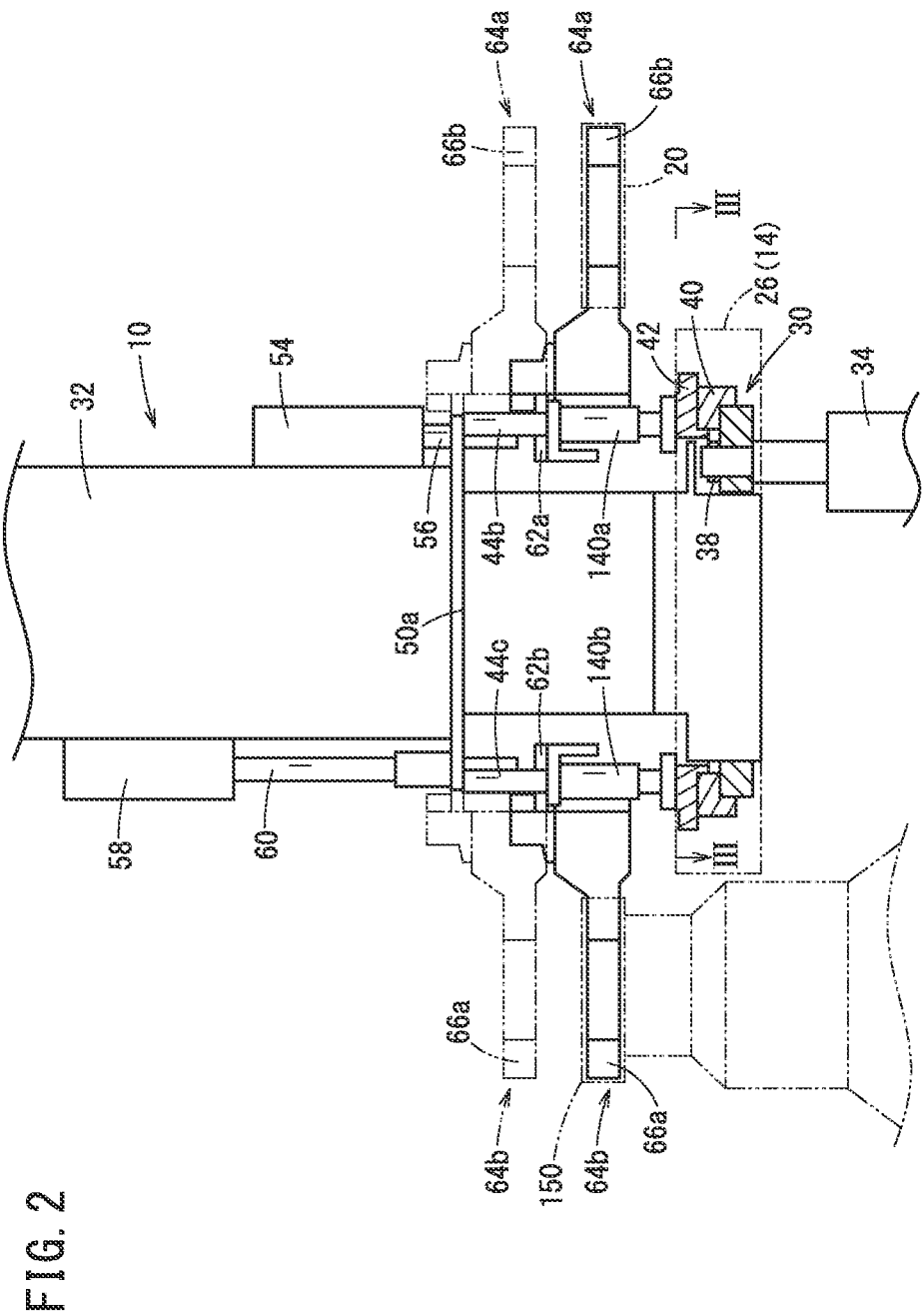
FIG. 2 is a longitudinal sectional view of a principal part of the workpiece supply-and-discharge device illustrated in FIG. 1.
Figure 3:
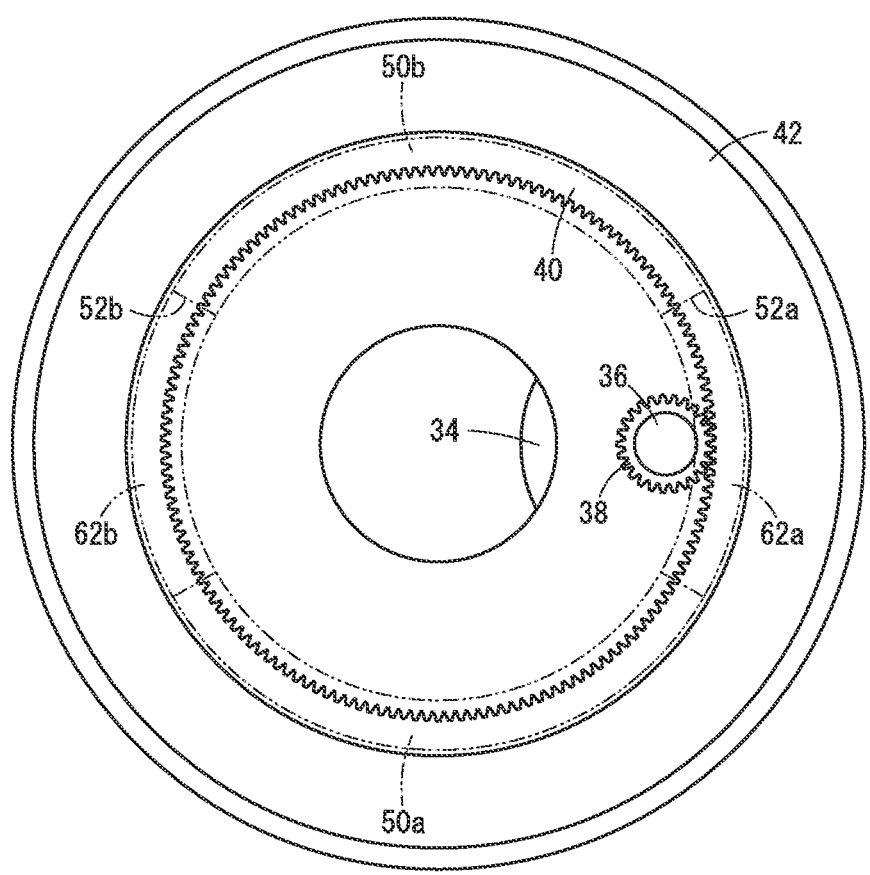
FIG. 3 is a cross-sectional view taken along line III-III in FIG. 2.

The workpiece supply-and-discharge device 10 includes a swivel portion 30 and a fixed portion 32. The swivel portion 30 can swivel on the hollow base 26 as a swivel motor 34 (swivel actuator) illustrated in FIG. 2 operates. Specifically, the swivel motor 34 is supported by the bed 14, and a distal end of a rotating shaft 36 constituting the swivel motor 34 is located inside the hollow base 26. A driving gear 38 is fitted onto the rotating shaft 36. The swivel portion 30 includes a driven gear 40 serving as an internal gear member illustrated in FIGS. 2 and 3. The tooth portion of the driven gear 40 having a ring shape is cut in the inner circumferential wall of the driven gear 40 and serves as an internal gear. As a matter of course, the tooth portions of the driving gear 38 and the driven gear 40 mesh with each other. Consequently, the swivel portion 30 including the driven gear 40 swivels as the rotating shaft 36 rotates.

The swivel portion 30 further includes an annular plate 42 superposed on the driven gear 40. Four guide bars 44a to 44d protrude upward from the annular plate 42 and serve as guiding members. The guide bars 44a and 44b disposed close to each other are paired. Similarly, the guide bars 44c and 44d disposed close to each other are paired. The guide bars 44a and 44c and the guide bars 44b and 44d are separated from each other by substantially 180°. In the description below, the separation angle may also be referred to as "phase difference". For example, in a case where the separation angle between two members is 180°, the phase difference between the two members is 180°.

A spacer 46 is disposed inside the hollow base 26 and supported by the upper surface of the hollow base 26. The bottom surface of the fixed portion 32 having a substantially columnar shape is connected to the top surface of the spacer 46. The fixed portion 32 is a single member and does not swivel even when the swivel portion 30 swivels.

A first fixed rail 50a and a second fixed rail 50b are positioned and secured in the vicinity of the lower end of the fixed portion 32. The first fixed rail 50a and the second fixed rail 50b each have a shape of an arc less than a semicircle. As a result, a first gap 52a and a second gap 52b are left between the first fixed rail 50a and the second fixed rail 50b. The first gap 52a is separated from the rotary table 16 by a phase difference of substantially 180°, while the second gap 52b is located in a position facing the rotary table 16.

The fixed portion 32 is provided with flat surfaces, formed by partially cutting off the curved sidewall of the fixed portion 32, in an area separated from the rotary table 16 by a phase difference of substantially 180° and in an area separated from the above-described area by a phase difference of substantially 180° and facing the rotary table 16. A first reciprocating cylinder 54 is disposed on the flat surface in the area separated from the rotary table 16 by the phase difference of substantially 180°. The distal ends of first reciprocating rods 56 constituting the first reciprocating cylinder 54 oppose the first gap 52a. Similarly, a second reciprocating cylinder 58 is disposed on the flat surface in the area facing the rotary table 16, and the distal ends of second reciprocating rods 60 constituting the second reciprocating cylinder 58 oppose the second gap 52b.

As illustrated in FIG. 1, the lower ends of the first reciprocating rods 56 and the second reciprocating rods 60 are respectively connected to a first movable rail 62a and a second movable rail 62b, both being substantially arc-shaped, in areas where the rails do not interfere with cam followers 144 (described below). When the first reciprocating rods 56 and the second reciprocating rods 60 extend downward (descend), the first movable rail 62a exits from the first gap 52a, and the second movable rail 62b exits from the second gap 52b.

Conversely, when the first reciprocating rods 56 and the second reciprocating rods 60 contract upward (ascend), the first movable rail 62a enters the first gap 52a, and the second movable rail 62b enters the second gap 52b. That is, the first movable rail 62a, the first fixed rail 50a, the second movable rail 62b, and the second fixed rail 50b are arranged in a ring shape. In this manner, the first reciprocating cylinder 54 and the second reciprocating cylinder 58 serve as reciprocating actuators that move the first movable rail 62a and the second movable rail 62b into and out of the first gap 52a and the second gap 52b, respectively.

The workpiece supply-and-discharge device 10 further includes a first gripping portion 64a and a second gripping portion 64b. The first gripping portion 64a and the second gripping portion 64b correspond to workpiece gripping portions each configured to grip the helical gear 20 using a first gripping claw 66a and a second gripping claw 66b (gripping members). In FIG. 1, the first gripping portion 64a faces a supply table or a discharge table (not illustrated), and the second gripping portion 64b faces the rotary table 16. Next, the first gripping portion 64a and the second gripping portion 64b will be described.

Figure 4:
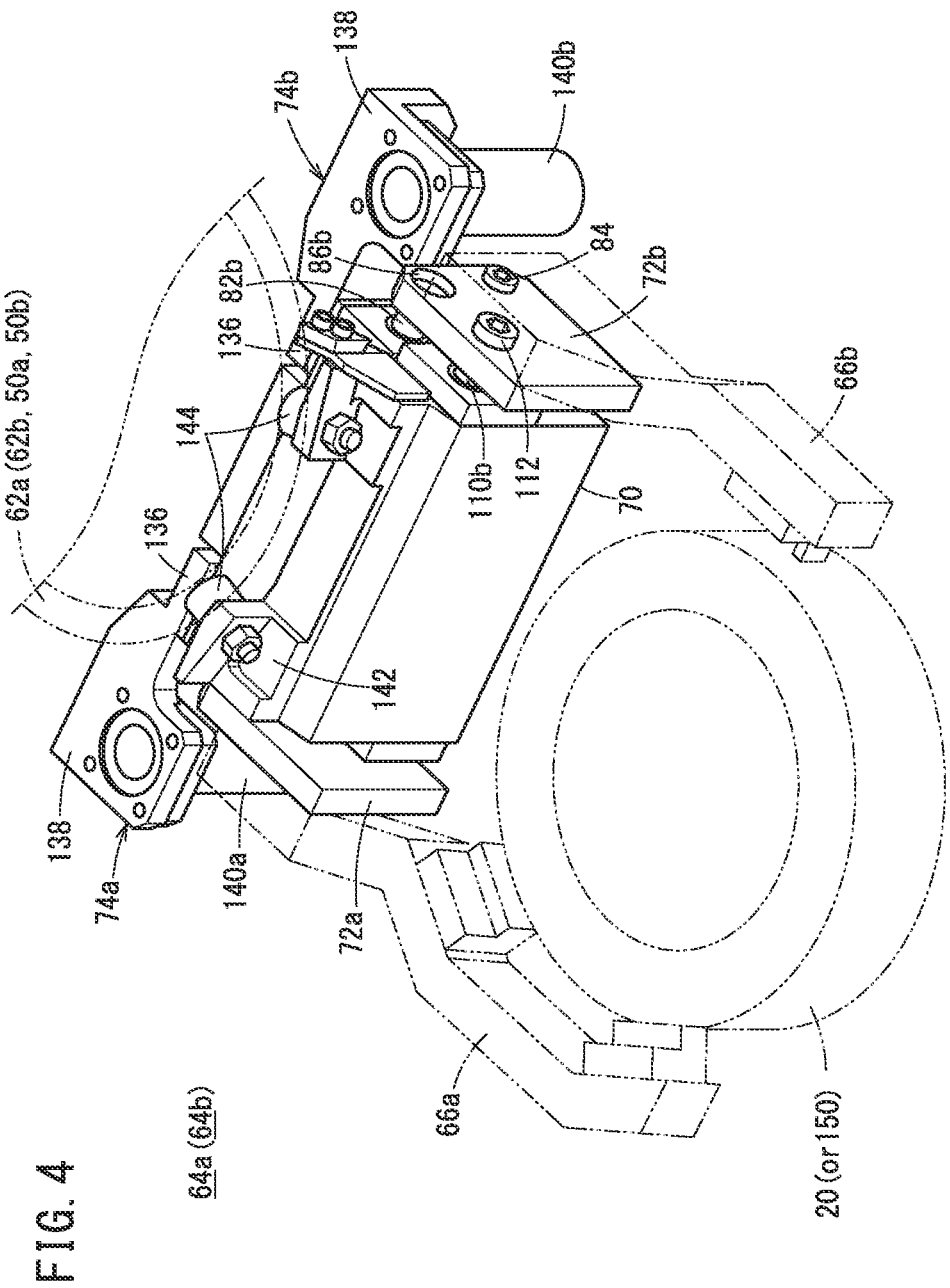
FIG. 4 is a schematic general perspective view of a gripping portion constituting the workpiece supply-and-discharge device.

FIG. 4 is a schematic general perspective view of the first gripping portion 64a. The first gripping portion 64a includes a casing 70, a first movable plate 72a and a second movable plate 72b that are displaced to approach or be separated from the casing 70, and a first bush holding plate 74a and a second bush holding plate 74b that are connected to the casing 70. The first gripping claw 66a is connected to the first movable plate 72a, and the second gripping claw 66b is connected to the second movable plate 72b. In the casing 70, end faces on which the first movable plate 72a and the second movable plate 72b are disposed are referred to as "side faces", a side on which the first gripping claw 66a and the second gripping claw 66b extend is referred to as "the front", and a side on which the first bush holding plate 74a and the second bush holding plate 74b are disposed is referred to as "the back". In addition, a direction from the first movable plate 72a to the second movable plate 72b (or the opposite direction) may also be expressed as "longitudinal direction".

Figure 5:
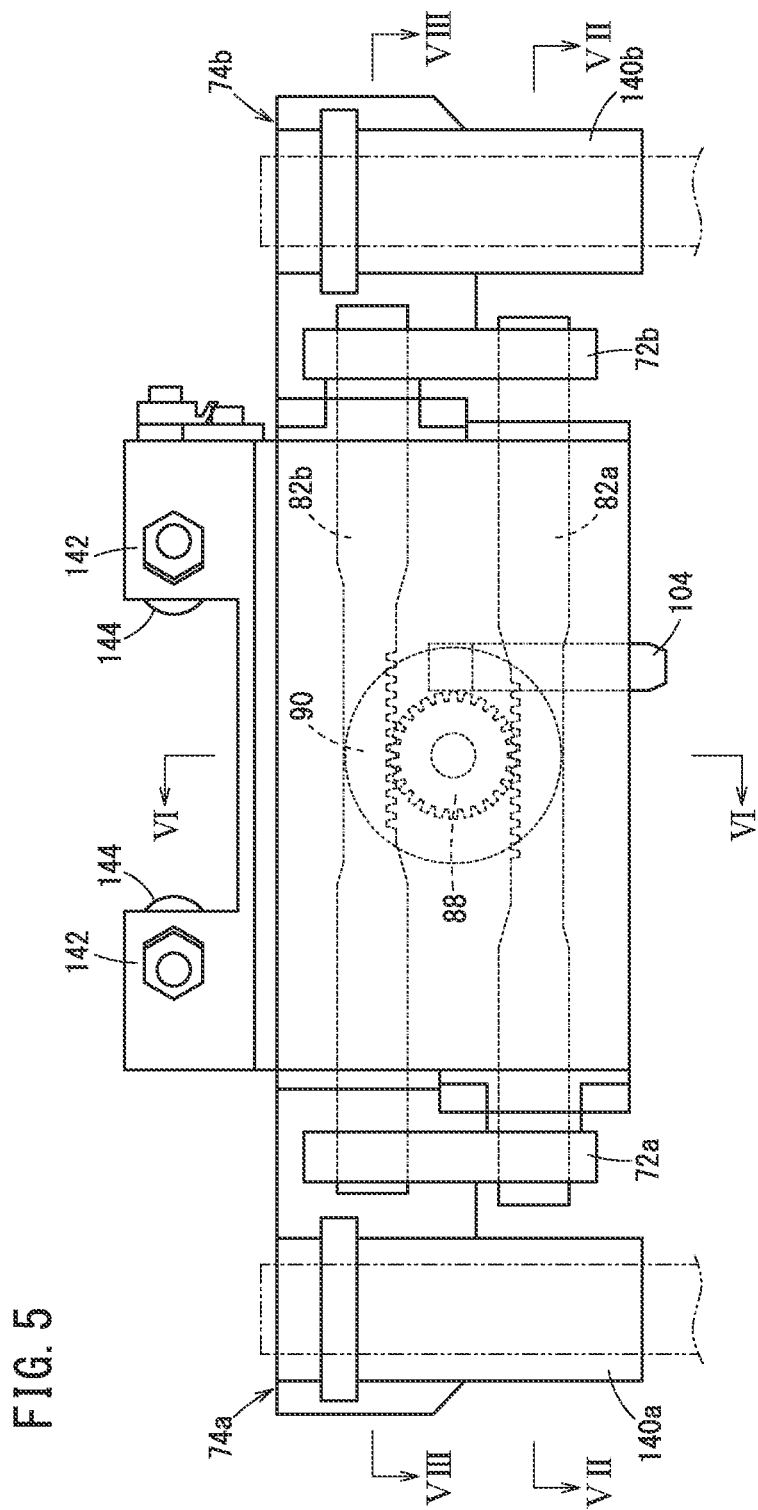
FIG. 5 is a schematic front view of the gripping portion illustrated in FIG. 4.
Figure 6:
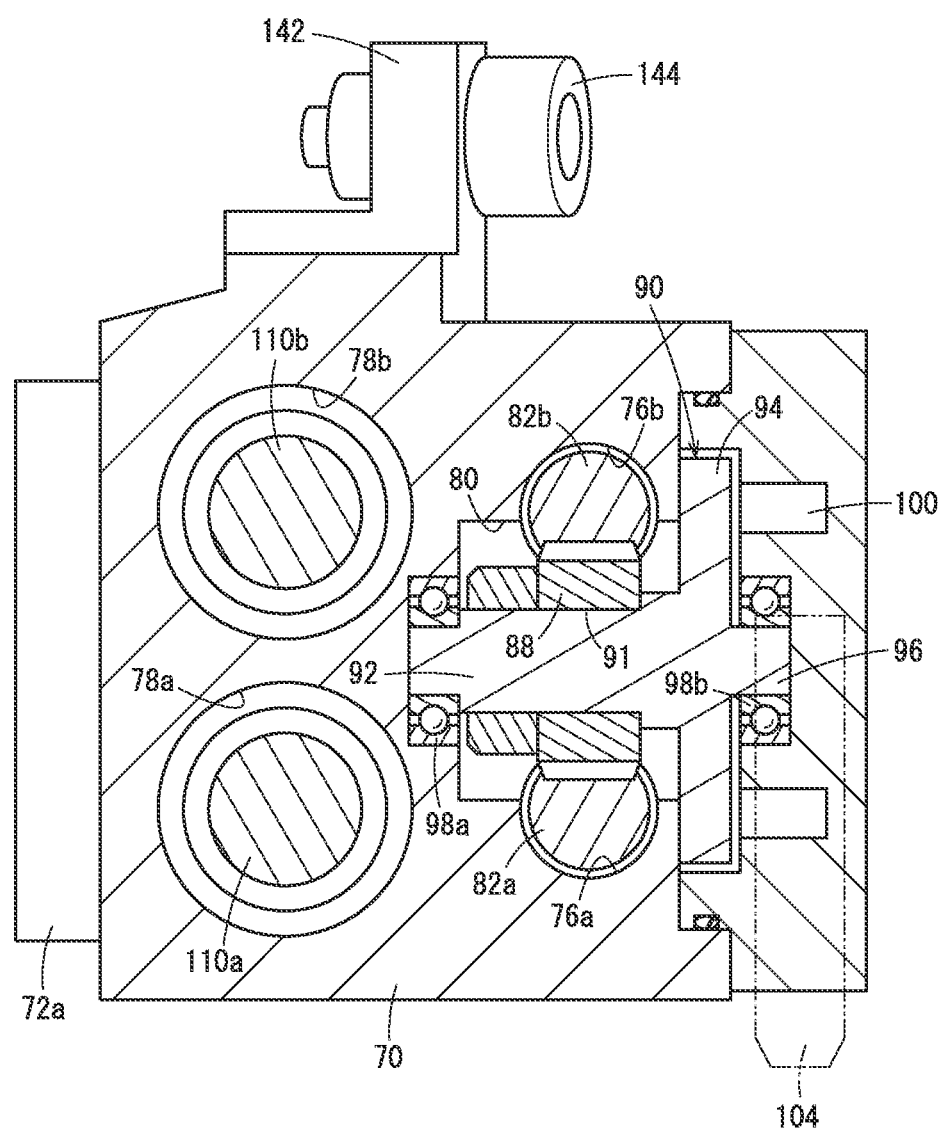
FIG. 6 is a cross-sectional view taken along line VI-VI in FIG. 5.

FIG. 5 is a schematic front view of the first gripping portion 64a, and FIG. 6 is a cross-sectional view taken along line VI-VI in FIG. 5. As can be understood from FIG. 6, inside the casing 70, a first rack storage hole 76a, a second rack storage hole 76b, a first spring storage hole 78a, and a second spring storage hole 78b extend in the longitudinal direction. The first rack storage hole 76a and the second rack storage hole 76b are aligned vertically in positions adjacent to the back, and the first spring storage hole 78a and the second spring storage hole 78b are aligned vertically in positions adjacent to the front. The inner diameter of the first spring storage hole 78a and the second spring storage hole 78b is larger than the inner diameter of the first rack storage hole 76a and the second rack storage hole 76b.

The first rack storage hole 76a and the second rack storage hole 76b each have openings opened in both side faces. The casing 70 also has a pinion storage hole 80 hollowed from the back to the front. The pinion storage hole 80 adjoins the first rack storage hole 76a and the second rack storage hole 76b substantially at the midpoints of the first rack storage hole 76a and the second rack storage hole 76b in the longitudinal direction.

Figure 7:
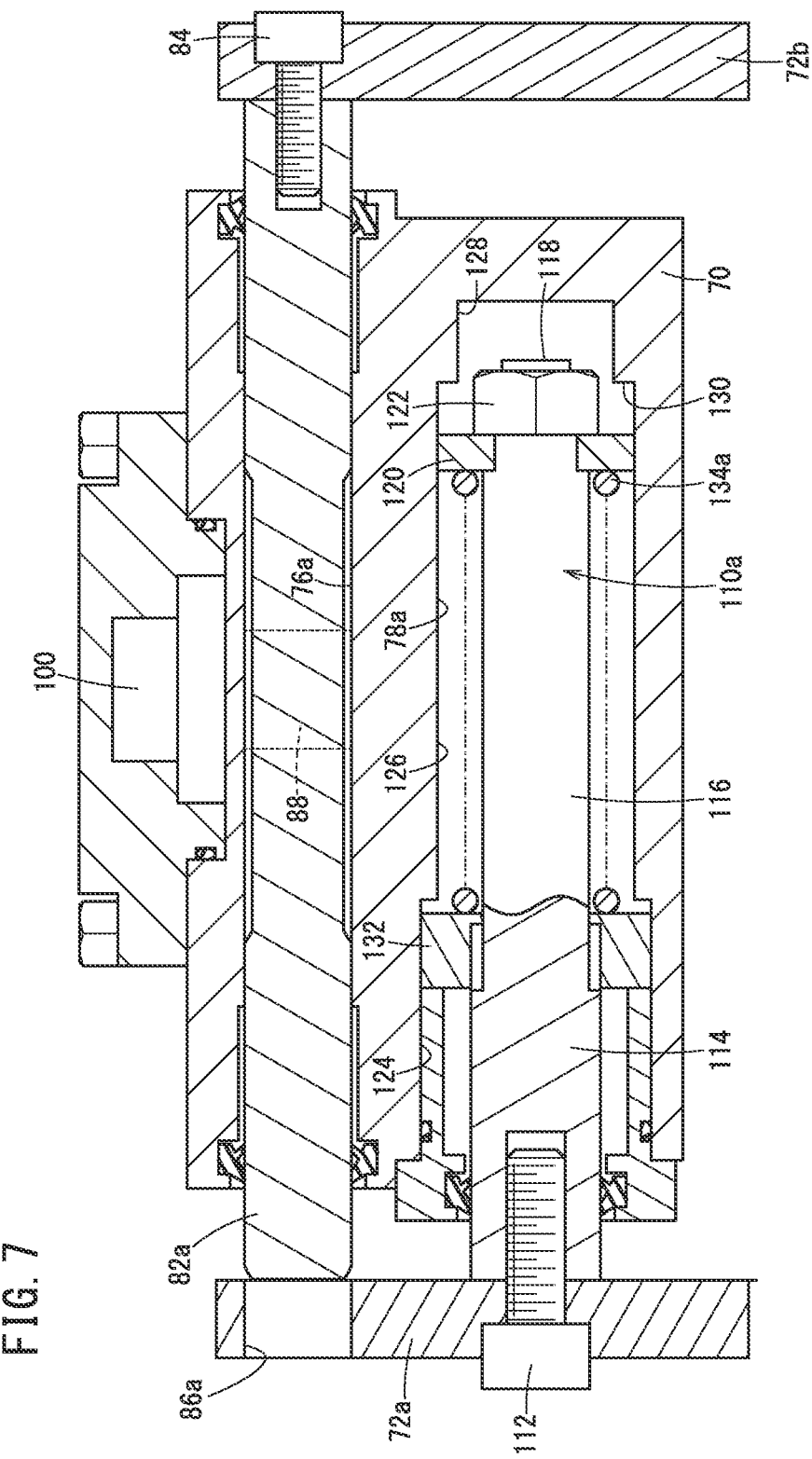
FIG. 7 is a cross-sectional view taken along line VII-VII in FIG. 5.
Figure 8:
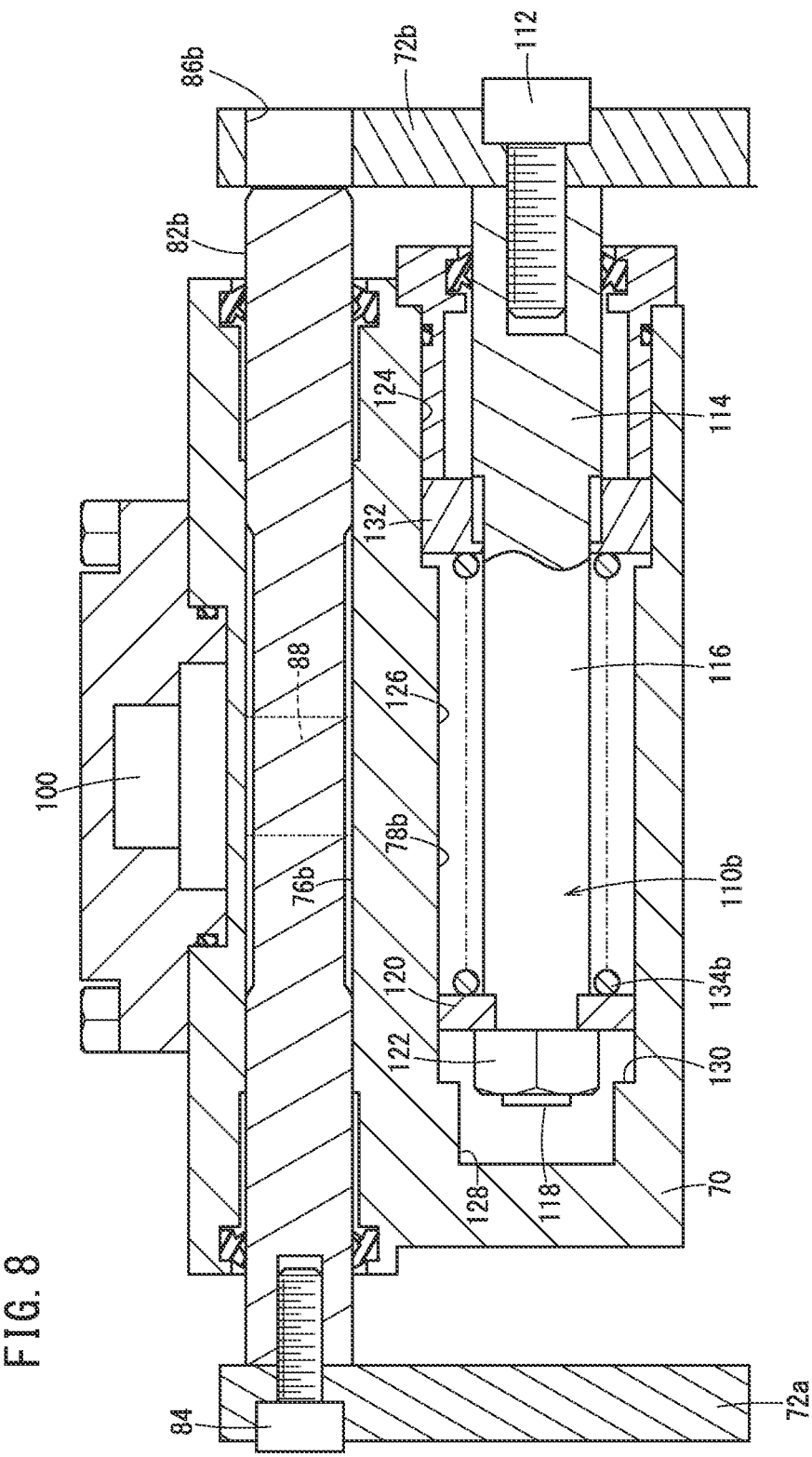
FIG. 8 is a cross-sectional view taken along line VIII-VIII in FIG. 5.

A first rack gear 82a and a second rack gear 82b (both first gears) are respectively stored in the first rack storage hole 76a and the second rack storage hole 76b. As illustrated in FIG. 5, the first rack gear 82a and the second rack gear 82b are longer than the casing 70, and both ends thereof protrude from the side faces of the casing 70 in the longitudinal direction. As illustrated in FIG. 7, which is a cross-sectional view taken along line VII-VII in FIG. 5, a first end of the first rack gear 82a is connected to the second movable plate 72b via a connecting bolt 84, while a second end of the first rack gear 82a enters or exits from an insertion hole 86a created in the first movable plate 72a. Similarly, as illustrated in FIG. 8, which is a cross-sectional view taken along line VIII-VIII in FIG. 5, a first end of the second rack gear 82b is connected to the first movable plate 72a via a connecting bolt 84, while a second end of the second rack gear 82b enters or exits from an insertion hole 86b created in the second movable plate 72b. Clearances are left between the circumferential sidewall of the first rack gear 82a and the inner circumferential wall of the insertion hole 86a and between the circumferential sidewall of the second rack gear 82b and the inner circumferential wall of the insertion hole 86b.

As illustrated in FIGS. 5 to 7, the tooth portion of the first rack gear 82a is formed on a side facing the second rack gear 82b and is exposed inside the pinion storage hole 80. Similarly, the tooth portion of the second rack gear 82b is formed on a side facing the first rack gear 82a and is exposed inside the pinion storage hole 80.

A pinion gear 88 (second gear) is stored in the pinion storage hole 80. The tooth portion of the pinion gear 88 meshes with the tooth portions of the first rack gear 82a and the second rack gear 82b. In other words, the pinion gear 88 meshes both with the first rack gear 82a and the second rack gear 82b at the same time. The phase difference between a point where the pinion gear 88 meshes with the first rack gear 82a and a point where the pinion gear 88 meshes with the second rack gear 82b is 180°.

As illustrated in FIG. 6, the pinion gear 88 is provided with a rotary plate 90 with a shaft serving as a member to be pushed. Specifically, a large-diameter shaft portion 92 of the rotary plate 90 is fitted in a through-hole 91 created in the pinion gear 88. In addition to the large-diameter shaft portion 92, the rotary plate 90 includes a disk portion 94 and a small-diameter shaft portion 96 protruding from the disk portion 94 in a direction opposite to that in which the large-diameter shaft portion 92 protrudes. The large-diameter shaft portion 92 is supported by the casing 70 via a bearing 98a, and the small-diameter shaft portion 96 is supported by a closing cover 100 via a bearing 98b. This enables the rotary plate 90 and the pinion gear 88 to rotate stably.

Figure 9:
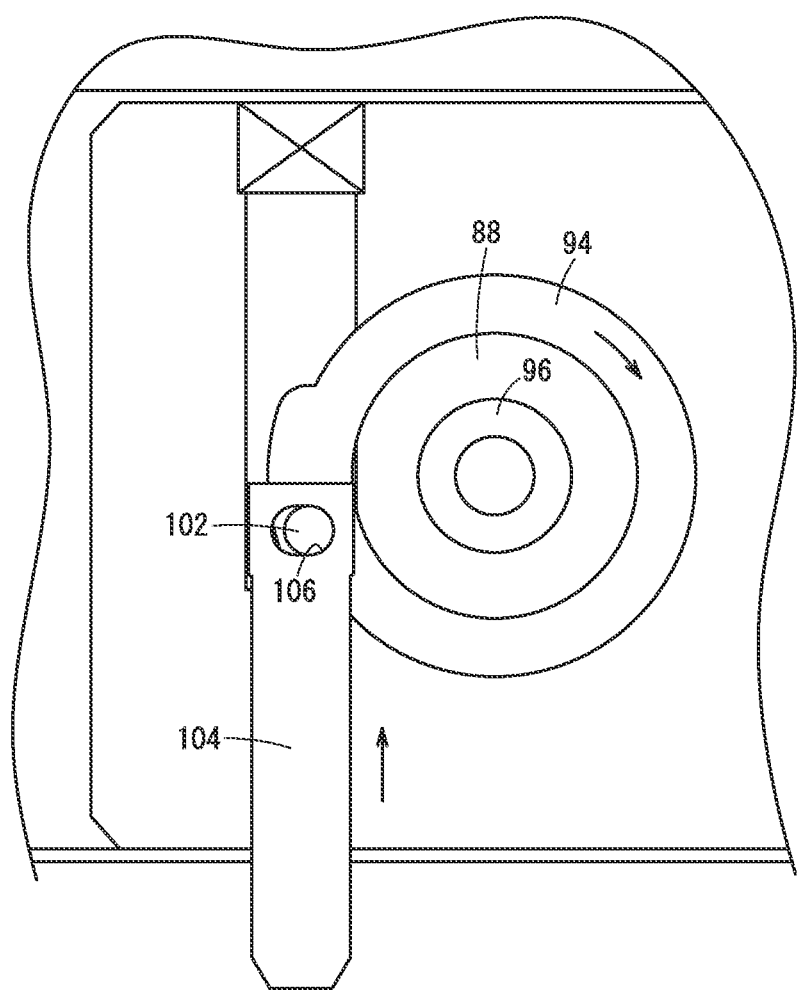
FIG. 9 is an enlarged rear view of a principal part of the gripping portion.

The disk portion 94 has a larger diameter than the pinion gear 88 and is exposed from the pinion storage hole 80. As illustrated in FIG. 9, an engagement pin portion 102 protrudes parallel to the small-diameter shaft portion 96 from a surface, of the disk portion 94, on which the small-diameter shaft portion 96 is disposed. The engagement pin portion 102 engages with an elongated insertion hole 106 created in a pinion drive pin 104 serving as a gear driving member. When the first movable rail 62a is disposed in the first gap 52a and at the same height as the first fixed rail 50a and the second fixed rail 50b, the lower end of the pinion drive pin 104 protrudes from the lower end of the casing 70 and exposed to the outside (see FIG. 5). As described below, when the first gripping portion 64a or the second gripping portion 64b descends, the pinion drive pin 104 is pushed by the swivel portion 30 or the annular plate 42 and raised with respect to the casing 70. This causes the pinion gear 88 to rotate.

The pinion drive pin 104, the pinion gear 88, the first rack gear 82a, and the second rack gear 82b described above convert the ascending and descending motion of the first gripping portion 64a and the second gripping portion 64b into opening and closing motion of the first gripping claw 66a and the second gripping claw 66b. That is, the pinion drive pin 104, the pinion gear 88, the first rack gear 82a, and the second rack gear 82b constitute a cam portion that converts directions of motion.

As illustrated in FIG. 7, the first spring storage hole 78a is opened in the side face adjacent to the first movable plate 72a and is closed at the side face adjacent to the second movable plate 72b. Similarly, as illustrated in FIG. 8, the second spring storage hole 78b is opened in the side face adjacent to the second movable plate 72b and is closed at the side face adjacent to the first movable plate 72a.

A first displaceable rod 110a is stored in the first spring storage hole 78a (see FIG. 7). The first displaceable rod 110a is attached to the first movable plate 72a via an attachment bolt 112. As a result, the first displaceable rod 110a is displaced inside the first spring storage hole 78a as the first movable plate 72a is displaced. The first displaceable rod 110a includes a large diameter portion 114, a medium diameter portion 116, and a small diameter portion 118 in this order from the first movable plate 72a to the second movable plate 72b. A substantially C-shaped first stopper 120 is disposed on the border between the small diameter portion 118 and the medium diameter portion 116. The first stopper 120 is pressed and secured by a nut 122 screwed on the small diameter portion 118.

The inner diameter of the first spring storage hole 78a is the largest on a side adjacent to the first movable plate 72a and gradually decreases toward the second movable plate 72b in a stepwise manner. As a result, the first spring storage hole 78a includes a large-diameter hole portion 124, a medium-diameter hole portion 126, and a small-diameter hole portion 128. An annular stepped portion 130 is formed between the medium-diameter hole portion 126 and the small-diameter hole portion 128 due to the difference in diameter between the hole portions 126 and 128. A substantially disk-shaped second stopper 132 rimming the large diameter portion 114 is positioned and secured in the large-diameter hole portion 124. In addition, a first return spring 134a serving as an elastic member is disposed between the first stopper 120 and the second stopper 132. That is, an end part of the first return spring 134a adjacent to the first movable plate 72a is seated on the second stopper 132, and another end part thereof adjacent to the second movable plate 72b is seated on the first stopper 120.

Similarly, a second displaceable rod 110b is stored in the second spring storage hole 78b (see FIG. 8). A first end of the second displaceable rod 110b protruding from the casing 70 is attached to the second movable plate 72b via an attachment bolt 112. As a result, the second displaceable rod 110b is displaced inside the second spring storage hole 78b as the second movable plate 72b is displaced. As can be understood from this, the second spring storage hole 78b is substantially identical to the first spring storage hole 78a, except for being flipped from side to side, and includes identical components. Thus, detailed descriptions and illustrations are omitted. In the description below, the same reference numbers and symbols are used for components corresponding to those inside the first spring storage hole 78a except for a spring, which is referred to as a second return spring and denoted by 134b, inside the second spring storage hole 78b. As a matter of course, the second return spring 134b is an elastic member.

Figure 11:
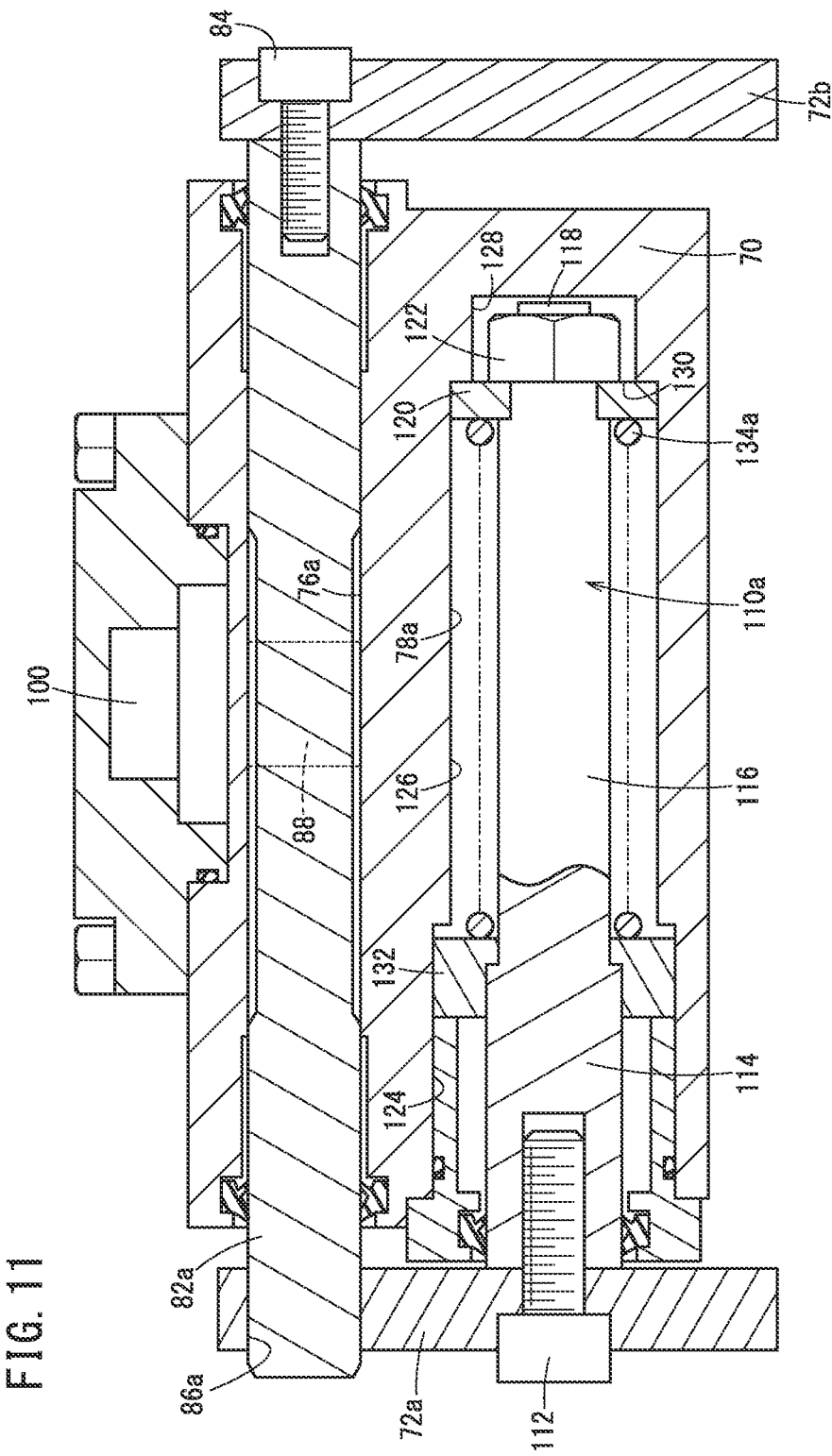
FIG. 11 is a lateral cross-sectional view illustrating a state where a first gripping claw and a second gripping claw are displaced to be close to each other from a state illustrated in FIG. 7.
Figure 12:
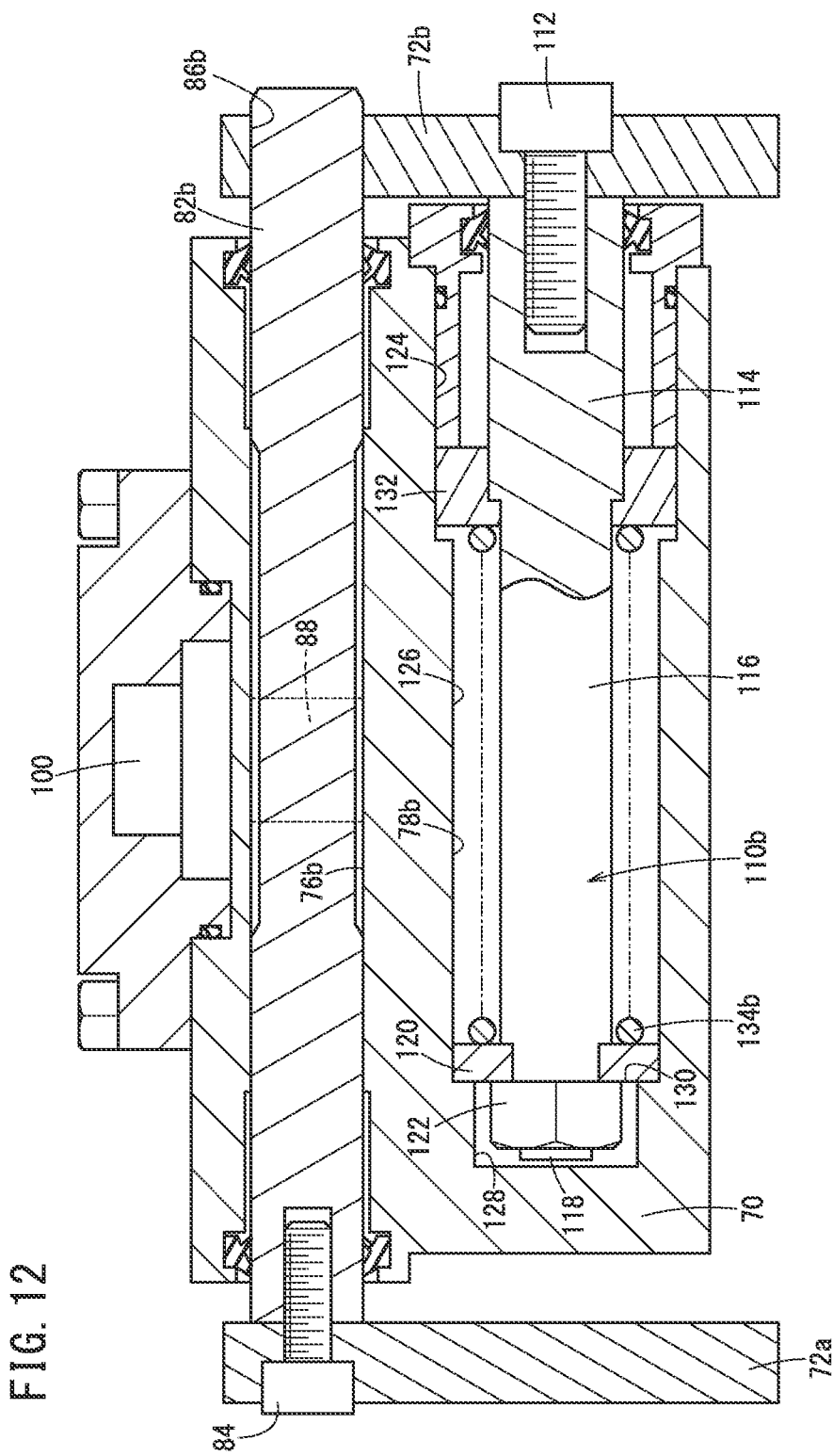
FIG. 12 is a lateral cross-sectional view illustrating a state where the first gripping claw and the second gripping claw are displaced to be close to each other from a state illustrated in FIG. 8.

In FIGS. 11 and 12 described below, the first movable plate 72a (and the first gripping claw 66a) and the second movable plate 72b (and the second gripping claw 66b) are close to each other (closed state). In this case, the second displaceable rod 110b and the first stopper 120 are relatively close to the first movable plate 72a, and thereby the second return spring 134b is extended. At this moment, the first displaceable rod 110a and the first stopper 120 are relatively close to the second movable plate 72b, and thereby the first return spring 134a is also extended.

By contrast, in FIGS. 7 and 8, the first movable plate 72a (and the first gripping claw 66a) and the second movable plate 72b (and the second gripping claw 66b) are separated from each other (open state). In this case, the first displaceable rod 110a and the first stopper 120 are relatively separated from the second movable plate 72b, and thereby the first return spring 134a is compressed. At this moment, the second displaceable rod 110b and the first stopper 120 are relatively separated from the first movable plate 72a. That is, the second return spring 134b is also compressed.

As illustrated in FIG. 4, the first bush holding plate 74a and the second bush holding plate 74b each include a narrow connection part 136 and a slightly wider bush supporting part 138 expanding from the connection part 136. A known first slide bush 140a and a known second slide bush 140b are positioned and secured to the bush supporting parts 138. The first slide bush 140a is fitted on the guide bar 44a to be slidable, and the second slide bush 140b is fitted on the guide bar 44b to be slidable. That is, the first slide bush 140a and the second slide bush 140b are engagement portions respectively engaging with the guide bars 44a and 44b to be displaceable.

In addition, a supporting board 142 is disposed on the upper surface of the casing 70. The two cam followers 144 serving as sliders are supported by the supporting board 142 to be rotatable. The two cam followers 144 are slightly inclined with respect to a direction from the front to the back of the casing 70 so that the radius of curvature thereof corresponds to the radius of curvature of the first movable rail 62a, the second movable rail 62b, the first fixed rail 50a, and the second fixed rail 50b. The first movable rail 62a, the second movable rail 62b, the first fixed rail 50a, and the second fixed rail 50b are disposed between the upper surface of the casing 70 and the cam followers 144. That is, the cam followers 144 slide along the first movable rail 62a, the second movable rail 62b, the first fixed rail 50a, or the second fixed rail 50b.

The second gripping portion 64b has a structure identical to that of the first gripping portion 64a. Thus, the same reference numbers and symbols are used for components identical to those in the first gripping portion 64a, and the detailed descriptions will be omitted. Note that the first slide bush 140a of the second gripping portion 64b is fitted on the guide bar 44c to be slidable, and that the second slide bush 140b is fitted on the guide bar 44d to be slidable. That is, the first slide bush 140a and the second slide bush 140b are engagement portions respectively engaging with the guide bars 44c and 44d to be displaceable.

The workpiece supply-and-discharge device 10 according to this embodiment is basically configured as above. Next, the operational effects of the workpiece supply-and-discharge device 10 will be described in relation to the operations thereof. For purposes of illustration, in the example below, the tooth portion of a helical gear 20 supported by the rotary table 16 is ground by the grindstone 18, and a resulting gear product 150 is then discharged while another helical gear 20 is supplied to the rotary table 16. The operations below are performed under sequence control exerted by a control circuit (not illustrated).

At this moment, the first gripping portion 64a faces the supply table (not illustrated), while the second gripping portion 64b faces the rotary table 16. The first gripping portion 64a and the second gripping portion 64b are both in the closed state where the first gripping claw 66a and the second gripping claw 66b are close to each other. The first movable rail 62a, the first fixed rail 50a, the second movable rail 62b, and the second fixed rail 50b are at the same height, and the four rails 50a, 50b, 62a, and 62b are arranged to form a circle. The two cam followers 144 of the first gripping portion 64a are disposed on the first movable rail 62a, and the two cam followers 144 of the second gripping portion 64b are disposed on the second movable rail 62b. As a result, the first gripping portion 64a is held by the first movable rail 62a, and the second gripping portion 64b is held by the second movable rail 62b.

In this state, the first reciprocating cylinder 54 is energized. That is, the first reciprocating rods 56 descend. As the first reciprocating rods 56 descend, the first movable rail 62a connected to the distal ends of the first reciprocating rods 56 descends in an integrated manner and exits from the first gap 52a. That is, as illustrated in FIG. 1 (and solid lines in FIG. 2), the first movable rail 62a moves to a position lower than the positions of the first fixed rail 50a and the second fixed rail 50b. As described above, the first gripping portion 64a is held by the first movable rail 62a at this moment. Consequently, the first gripping portion 64a also descends integrally with the first movable rail 62a and moves to a position lower than the position before descending. Note that the solid lines in FIG. 2 indicate the first gripping portion 64a in the lowest position.

Until the first gripping portion 64a reaches the lowest position after the start of the descent, the first slide bush 140a and the second slide bush 140b are respectively guided by the guide bars 44a and 44b. This prevents misalignment of the first gripping portion 64a.

Figure 10:
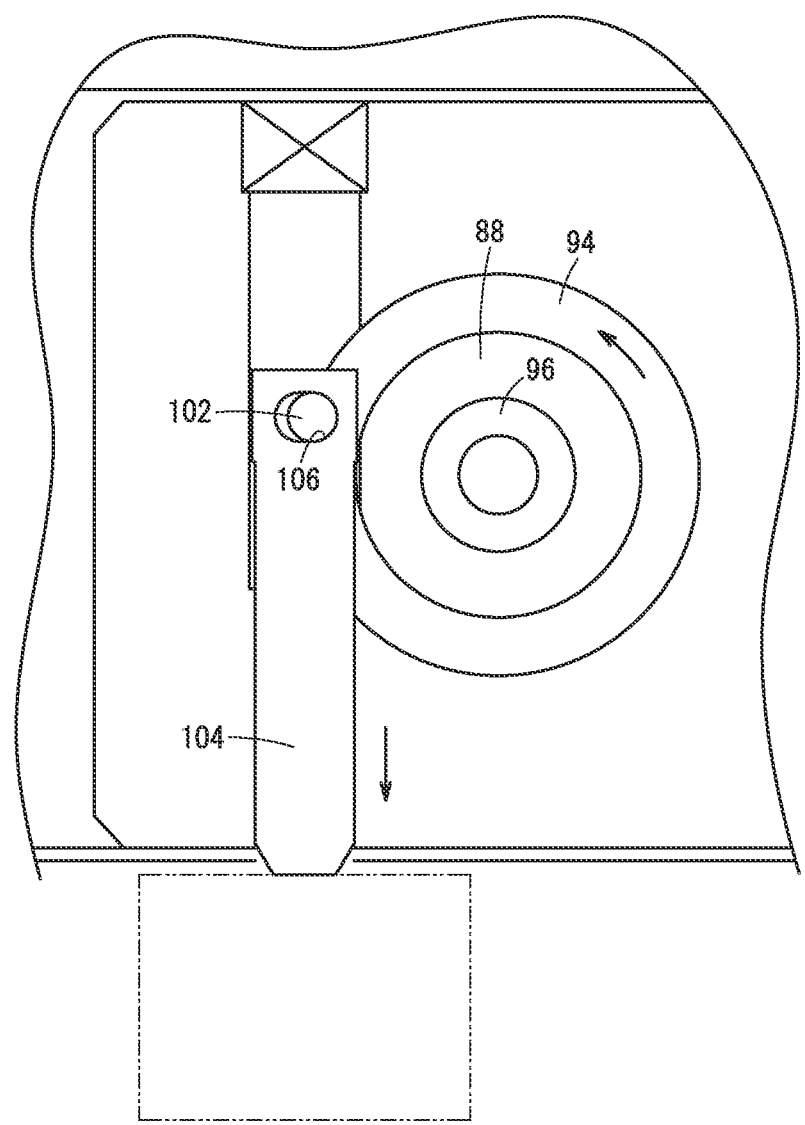
FIG. 10 is an enlarged rear view of the principal part illustrating a state where a gear driving member (pinion drive pin) is displaced toward a pinion gear constituting a second gear from a state illustrated in FIG. 9.

As the first reciprocating rods 56 descend, the lower end of the pinion drive pin 104 (see FIG. 9) protruding from the lower end of the casing 70 of the first gripping portion 64a comes into contact with the annular plate 42. As the first reciprocating rods 56 further descend, the annular plate 42 ascends relative to the pinion drive pin 104 and pushes the pinion drive pin 104. As a result, most part of the pinion drive pin 104 is pushed into the casing 70 as illustrated in FIG. 10. In other words, the pinion drive pin 104 relatively ascends inside the descending casing 70 and approaches the pinion gear 88.

The engagement pin portion 102 disposed on the disk portion 94 of the rotary plate 90 engages with the insertion hole 106 created in the pinion drive pin 104. Thus, as the pinion drive pin 104 is displaced to approach the pinion gear 88, the rotary plate 90 rotates clockwise when viewed from the back of the casing 70 or counterclockwise when viewed from the front. The tooth portion of the pinion gear 88 meshes with the tooth portions of the first rack gear 82a and the second rack gear 82b. Thus, as the pinion gear 88 rotates as described above, the first rack gear 82a is displaced to be separated away from the first movable plate 72a, and the second rack gear 82b is displaced to be separated from the second movable plate 72b.

Consequently, the second movable plate 72b held by the first rack gear 82a and the first movable plate 72a held by the second rack gear 82b are separated from each other. As a result, as illustrated in FIGS. 7 and 8, the first gripping claw 66a held by the first movable plate 72a and the second gripping claw 66b held by the second movable plate 72b are separated from each other to be brought into the open state. At this moment, as illustrated in FIG. 1, the helical gear 20 is disposed between the first gripping claw 66a and the second gripping claw 66b. That is, when the first gripping portion 64a is in the lowest position, the first gripping claw 66a and the second gripping claw 66b are in a workpiece release position.

While the first movable plate 72a is displaced to be separated from the second movable plate 72b, the end part of the first rack gear 82a facing the first movable plate 72a exits from the insertion hole 86a created in the first movable plate 72a (see FIG. 7). Similarly, while the second movable plate 72b is displaced to be separated from the first movable plate 72a, the end part of the second rack gear 82b facing the second movable plate 72b exits from the insertion hole 86b created in the second movable plate 72b (see FIG. 8).

Furthermore, as the first gripping claw 66a and the second gripping claw 66b are brought into the open state (workpiece release position) as described above, the first displaceable rod 110a and the first stopper 120 are displaced in the direction away from the second movable plate 72b (see FIG. 7), while the second displaceable rod 110b and the first stopper 120 are displaced in the direction away from the first movable plate 72a (see FIG. 8). As being displaced, the first stoppers 120 separated from the annular stepped portions 130 approach the second stoppers 132 in the fixed positions. As a result, the first return spring 134a and the second return spring 134b disposed between the first stoppers 120 and the second stoppers 132 are compressed.

Next, the first reciprocating cylinder 54 is re-energized, and the first reciprocating rods 56 ascend. As the first reciprocating rods 56 ascend, the first movable rail 62a and the first gripping portion 64a ascend in an integrated manner. As the first slide bush 140a and the second slide bush 140b are respectively guided by the guide bars 44a and 44b also during ascending, the first gripping portion 64a is prevented from being misaligned.

As the first gripping portion 64a ascends, the reaction force exerted on the pinion drive pin 104 by the annular plate 42 (pushing force on the pinion drive pin 104 by the annular plate 42) gradually decreases. The elastic biasing force of the compressed first return spring 134a and the second return spring 134b eventually exceeds the reaction force from the annular plate 42. That is, the first return spring 134a and the second return spring 134b extend as illustrated in FIGS. 11 and 12. As the springs extend, the first stopper 120 provided for the first displaceable rod 110a is elastically biased to the second movable plate 72b, while the first stopper 120 provided for the second displaceable rod 110b is elastically biased to the first movable plate 72a.

Consequently, the first displaceable rod 110a and the first movable plate 72a are displaced to approach the second movable plate 72b, while the second displaceable rod 110b and the second movable plate 72b are displaced to approach the first movable plate 72a. With this, the first gripping claw 66a held by the first movable plate 72a and the second gripping claw 66b held by the second movable plate 72b approach each other to be brought into the closed state. As a result, the helical gear 20 is gripped by the first gripping claw 66a and the second gripping claw 66b. That is, as the first gripping portion 64a ascends, the first gripping claw 66a and the second gripping claw 66b move to a workpiece grip position.

As the first gripping claw 66a and the second gripping claw 66b approach each other, the second rack gear 82b holding the first movable plate 72a and the first rack gear 82a holding the second movable plate 72b are displaced to approach each other. At this moment, the pinion gear 88 meshing with the tooth portions of the first rack gear 82a and the second rack gear 82b rotates counterclockwise of the casing 70 when viewed from the back or clockwise when viewed from the front. This rotation causes the pinion drive pin 104 to relatively descend inside the ascending casing 70. As a result, the lower end of the pinion drive pin 104 gradually protrudes from the casing 70. During this period, the end part of the first rack gear 82a facing the first movable plate 72a enters the insertion hole 86a created in the first movable plate 72a. Similarly, the end part of the second rack gear 82b facing the second movable plate 72b enters the insertion hole 86b created in the second movable plate 72b.

The first return spring 134a and the second return spring 134b stop extending when the first stoppers 120 are stopped by the annular stepped portions 130 inside the first spring storage hole 78a and the second spring storage hole 78b, respectively. At this moment, the first gripping portion 64a returns to a position indicated by virtual lines in FIG. 2. That is, the first movable rail 62a is disposed in the first gap 52a and at the same height as the first fixed rail 50a and the second fixed rail 50b. At this moment, the helical gear 20 gripped by the first gripping claw 66a and the second gripping claw 66b is sufficiently separated from the supply table.

The same operations are also performed at the second gripping portion 64b. That is, the second reciprocating cylinder 58 is energized in synchronization with the energization of the first reciprocating cylinder 54, and the second reciprocating rods 60 descend. This causes the second movable rail 62b to descend integrally with the second gripping portion 64b and exit from the second gap 52b to a position lower than the first fixed rail 50a and the second fixed rail 50b (see the solid lines in FIG. 2).

The pinion drive pin 104 relatively ascends inside the descending casing 70 and approaches the pinion gear 88. As a result, the first gripping claw 66a and the second gripping claw 66b are brought into the open state, and the gear product 150 is disposed between the gripping claws. As a matter of course, the first return spring 134a and the second return spring 134b disposed between the first movable plate 72a and the second movable plate 72b are compressed.

Subsequently, the second reciprocating cylinder 58 is re-energized, and the second reciprocating rods 60 ascend. As the second reciprocating rods 60 ascend, the first movable plate 72a (and the first gripping claw 66a) and the second movable plate 72b (and the second gripping claw 66b) approach each other, and the first gripping claw 66a and the second gripping claw 66b are brought into the closed state. As a result, the gear product 150 is securely gripped by the second gripping portion 64b. The first return spring 134a and the second return spring 134b gradually extend and eventually return to the original length. While the second reciprocating rods 60 descend and ascend as described above, the first slide bush 140a and the second slide bush 140b are respectively guided by the guide bars 44c and 44d, and the pinion drive pin 104 relatively ascends and descends inside the casing 70 of the second gripping portion 64b as a matter of course.

In the second gripping portion 64b, the second movable rail 62b ascends to enter the second gap 52b and be disposed at the same height as the first fixed rail 50a and the second fixed rail 50b. At this moment, the gear product 150 gripped by the first gripping claw 66a and the second gripping claw 66b is sufficiently separated from the rotary table 16.

Next, the swivel motor 34 (see FIGS. 2 and 3) is energized. This causes the rotating shaft 36 and the driving gear 38 to rotate in an integrated manner, and thus causes the driven gear 40, of which tooth portion meshes with the tooth portion of the driving gear 38, to rotate (swivel) by approximately 180°. With this rotation, the swivel portion 30 including the driven gear 40 and the annular plate 42 swivels by approximately 180°. The guide bars 44a to 44d protruding upward from the annular plate 42 also swivel as the driven gear 40 rotates. The swiveling direction is, for example, clockwise. While the swivel portion 30 swivels, the supply table automatically interchanges with the discharge table.

The first slide bush 140a and the second slide bush 140b of the first gripping portion 64a are respectively fitted on the guide bars 44a and 44b. Consequently, the first gripping portion 64a swivels by approximately 180° together with the guide bars 44a and 44b. At this moment, the cam followers 144 of the first gripping portion 64a slide on the first movable rail 62a and transfer to the first fixed rail 50a. The cam followers 144 further slide on the first fixed rail 50a and transfer to the second movable rail 62b. As a result of the swiveling of the first gripping portion 64a by approximately 180°, the first gripping portion 64a and the helical gear 20 gripped by the first gripping claw 66a and the second gripping claw 66b of the first gripping portion 64a face the rotary table 16. That is, the helical gear 20 is carried adjacent to the rotary table 16 by the swiveling.

The first slide bush 140a and the second slide bush 140b of the second gripping portion 64b are respectively fitted on the guide bars 44c and 44d. Consequently, the second gripping portion 64b swivels together with the guide bars 44c and 44d at the same time as the first gripping portion 64a swivels together with the guide bars 44a and 44b. At this moment, the cam followers 144 of the second gripping portion 64b slide on the second movable rail 62b and transfer to the second fixed rail 50b. The cam followers 144 further slide on the second fixed rail 50b and transfer to the first movable rail 62a. As a result of the swiveling of the second gripping portion 64b by approximately 180°, the second gripping portion 64b and the gear product 150 gripped by the first gripping claw 66a and the second gripping claw 66b of the second gripping portion 64b face the discharge table. That is, the gear product 150 is carried away from the rotary table 16 by the swiveling.

Hereafter, the above-described operations are repeated. That is, the first reciprocating cylinder 54 is energized, and the first reciprocating rods 56, the first movable rail 62a, and the second gripping portion 64b descend in an integrated manner. The first movable rail 62a thus exits from the first gap 52a. As the first movable rail 62a descends and exits from the first gap 52a, the gear product 150 gripped by the first gripping claw 66a and the second gripping claw 66b of the second gripping portion 64b is disposed on the discharge table.

At the same time, the second reciprocating cylinder 58 is energized, and the second reciprocating rods 60, the second movable rail 62b, and the first gripping portion 64a descend in an integrated manner. The second movable rail 62b thus exits from the second gap 52b. As the second movable rail 62b descends and exits from the second gap 52b, the helical gear 20 gripped by the first gripping claw 66a and the second gripping claw 66b of the first gripping portion 64a is supported by the rotary table 16. Subsequently, the helical gear 20 is subjected to a machining work using the grindstone 18. That is, the inclined teeth are ground by the grindstone 18. During the grinding, the gear product 150 is discharged from the discharge table, and the discharge table automatically interchanges with the supply table.

After a gear product 150 is obtained by grinding the inclined teeth of the helical gear 20 supported by the rotary table 16, the first reciprocating rods 56, the first movable rail 62a, and the second gripping portion 64b ascend in an integrated manner. With this, the first movable rail 62a enters the first gap 52a while a new helical gear 20 is gripped by the first gripping claw 66a and the second gripping claw 66b.

In synchronization with this, the second reciprocating cylinder 58 is energized, and the second reciprocating rods 60, the second movable rail 62b, and the first gripping portion 64a ascend in an integrated manner. With this, the second movable rail 62b enters the second gap 52b while the gear product 150 is gripped by the first gripping claw 66a and the second gripping claw 66b.

Next, the swivel motor 34 is energized, and the swivel portion 30 swivels by approximately 180°. At this moment, the second gripping portion 64b swivels together with the guide bars 44c and 44d at the same time as the first gripping portion 64a swivels together with the guide bars 44a and 44b. The cam followers 144 of the first gripping portion 64a slide on the second movable rail 62b and transfer to the second fixed rail 50b. The cam followers 144 further slide on the second fixed rail 50b and transfer to the first movable rail 62a. Moreover, the cam followers 144 of the second gripping portion 64b slide on the first movable rail 62a and transfer to the first fixed rail 50a. The cam followers 144 further slide on the first fixed rail 50a and transfer to the second movable rail 62b. By the swiveling of the gripping portions by approximately 180°, the gear product 150 gripped by the first gripping claw 66a and the second gripping claw 66b of the first gripping portion 64a faces the discharge table, and the new helical gear 20 gripped by the first gripping claw 66a and the second gripping claw 66b of the second gripping portion 64b faces the rotary table 16.

In this manner, in this embodiment, when the first gripping portion 64a and the second gripping portion 64b descend and ascend, the directions of the motion are converted by the cam portions so that the first gripping claws 66a and the second gripping claws 66b are simultaneously opened and closed. Thus, the reciprocating actuators for moving the first gripping portion 64a and the second gripping portion 64b vertically can also be used as opening-and-closing actuators for opening and closing the first gripping claws 66a and the second gripping claws 66b. In other words, the opening-and-closing actuators do not need to be provided in addition to the reciprocating actuators. As a result, the workpiece supply-and-discharge device 10 can be reduced in size and weight accordingly.

In addition, in this case, the first gripping claws 66a and the second gripping claws 66b open and close at the same time as the first gripping portion 64a and the second gripping portion 64b descend and ascend. That is, sequential operations, such as lowering and raising of the first gripping portion 64a and the second gripping portion 64b followed by opening and closing of the first gripping claws 66a and the second gripping claws 66b, are prevented. This reduces the cycle time from when the first gripping portion 64a or the second gripping portion 64b starts descending to grip the helical gear 20 to when the resulting gear product 150 is discharged to the discharge table accordingly.

According to this embodiment, supply of the helical gear 20 to the rotary table 16 (machining portion) and discharge of the gear product 150 from the rotary table 16 can be performed simultaneously by only swiveling the swivel portion 30 together with the first gripping portion 64a and the second gripping portion 64b. This reduces the total weight of members and mechanisms to be swiveled. That is, loads on the swivel motor 34 can be reduced. As a result, a small and lightweight motor can be selected as the swivel motor 34, increasing the swiveling speed accordingly to further reduce the cycle time.

The present invention is not limited in particular to the embodiment described above, and various modifications can be made thereto without departing from the scope of the present invention.

For example, the second gap 52b may be the only gap, and the first gripping portion 64a may be the only workpiece gripping portion. In this case, the helical gear 20 may be gripped by the first gripping portion 64a and carried to the rotary table 16. After machining, the gear product 150 may be gripped by the first gripping portion 64a and carried to the discharge table.

Moreover, the workpiece is not limited in particular to the helical gear 20, and the machining is also not limited in particular to grinding of the tooth portions of gears.

What is claimed is:

1. A workpiece supply-and-discharge device configured to supply an unmachined workpiece to a machining apparatus and to discharge a machined workpiece from the machining apparatus, the workpiece supply-and-discharge device comprising:
   a bed;
   a fixed portion supported on the bed;
   a swivel portion configured to swivel on the bed when energized by a swivel actuator;
   a plurality of fixed rails each having an arc shape and positioned to partially surround the fixed portion, the fixed rails being separated from each other;
   a reciprocating actuator configured to move a movable rail having an arc shape into and out of a gap left between the fixed rails;
   a guiding member included in the swivel portion; and
   a workpiece gripping portion including two gripping members configured to grip the workpiece, wherein:
   the workpiece gripping portion includes a slider configured to slide along the fixed rails or the movable rail, and an engagement portion engaging with the guiding member to be displaceable;
   when the slider is stopped on the movable rail, the movable rail is displaced toward or away from the gap integrally with the workpiece gripping portion, and the workpiece gripping portion grips the workpiece using the gripping members or releases the workpiece;
   when the movable rail is disposed in the gap, the swivel portion and the workpiece gripping portion swivel in an integrated manner to carry the workpiece;
   when the workpiece gripping portion is displaced integrally with the movable rail as the movable rail enters or exits from the gap between the fixed rails, the guiding member guides the engagement portion; and
   when the workpiece gripping portion swivels integrally with the swivel portion, the slider transfers from the movable rail to the fixed rails or from the fixed rails to the movable rail.

2. The workpiece supply-and-discharge device according to claim 1, wherein:
   the gap is one of a plurality of gaps left between the fixed rails;
   the movable rail is one of a plurality of movable rails;
   the workpiece gripping portion is one of a plurality of workpiece gripping portions each including two gripping members configured to grip the workpiece; and
   the movable rails and the workpiece gripping portions are disposed in the respective gaps.

3. The workpiece supply-and-discharge device according to claim 2, wherein:

the reciprocating actuator is one of a plurality of reciprocating actuators configured to move the movable rails into and out of the gaps;

a number of the reciprocating actuators corresponds to a number of the movable rails; and all the reciprocating actuators are positioned and secured to the fixed portion.

4. The workpiece supply-and-discharge device according to claim 1, wherein the workpiece gripping portion includes a cam portion configured to separate the two gripping members from each other to bring the gripping members into a workpiece release position when the movable rail exits from the gap.

5. The workpiece supply-and-discharge device according to claim 4, wherein the cam portion includes two first gears respectively provided for the two gripping members, one second gear meshing with the two first gears simultaneously, and a gear driving member configured to drive the second gear to rotate when the movable rail exits from the gap.

6. The workpiece supply-and-discharge device according to claim 5, wherein the two first gears correspond to rack gears, and the second gear corresponds to a pinion gear.

7. The workpiece supply-and-discharge device according to claim 4, wherein:

the workpiece gripping portion includes an elastic member compressed when the two gripping members are separated from each other; and the elastic member elastically biases the two gripping members to bring the gripping members into a workpiece grip position where the gripping members are close to each other when the movable rail enters the gap.

8. The workpiece supply-and-discharge device according to claim 1, wherein:

the swivel actuator includes a rotating shaft provided with a driving gear; and the swivel portion is provided with a driven gear.

* * * * *